United States Patent
Eriksen et al.

(10) Patent No.: US 9,689,769 B2
(45) Date of Patent: Jun. 27, 2017

(54) PRESSURE TRANSMITTER HAVING AN ISOLATION ASSEMBLY WITH A TWO-PIECE ISOLATOR PLUG

(71) Applicant: Rosemount Inc., Chanhassen, MN (US)

(72) Inventors: Christopher Lee Eriksen, St. Paul, MN (US); Lihong Xu, Beijing (CN)

(73) Assignee: Rosemount Inc., Chanhassen, MN (US)

( * ) Notice: Subject to any disclaimer, the term of this patent is extended or adjusted under 35 U.S.C. 154(b) by 265 days.

(21) Appl. No.: 14/007,219

(22) PCT Filed: Jul. 19, 2013

(86) PCT No.: PCT/CN2013/079695
§ 371 (c)(1),
(2) Date: Sep. 24, 2013

(87) PCT Pub. No.: WO2015/006977
PCT Pub. Date: Jan. 22, 2015

(65) Prior Publication Data
US 2015/0020600 A1    Jan. 22, 2015

(51) Int. Cl.
*G01L 7/00*    (2006.01)
*G01L 19/06*    (2006.01)
(Continued)

(52) U.S. Cl.
CPC .......... *G01L 19/06* (2013.01); *G01L 19/0645* (2013.01); *G01L 7/082* (2013.01);
(Continued)

(58) Field of Classification Search
CPC ............. G01L 19/0645; G01L 19/0046; G01L 19/003; G01L 7/082; Y10T 29/49815
(Continued)

(56) References Cited

U.S. PATENT DOCUMENTS 4,161,887 A * 7/1979 Stone ...................... G01L 9/006
338/4
4,163,395 A * 8/1979 Medlar ................. G01L 9/0054
73/708
(Continued)

FOREIGN PATENT DOCUMENTS

CN    88 1 01231 A    9/1988
CN    1182479 A *    5/1998    ......... G01L 19/0084
(Continued)

OTHER PUBLICATIONS

Notification of Transmittal of the International Search Report and the Written Opinion of the International Searching Authority, or the Declaration for PCT Application No. PCT/CN2013/079695. dated Apr. 30, 2014, 3 pages.

(Continued)

*Primary Examiner* — Jonathan Dunlap
(74) *Attorney, Agent, or Firm* — Westman, Champlin & Koehler, P.A.

(57) ABSTRACT

A pressure transmitter connectable to a process line provides an output responsive to a pressure in the process line. The transmitter includes a housing having a base with a process end coupled to an interior cavity formed in the housing, a sensor for sensing the pressure and an isolating assembly mounted at the process end of the housing and isolating fluid in the process line from the interior cavity. The isolating assembly includes an isolation diaphragm configured to be fluidically coupled to the process pressure in the process line, and an isolator plug positioned in the process of the housing adapter. The isolator plug having a lower plug portion providing a first end surface adjacent the isolation diaphragm, an upper plug portion providing a second end surface distally spaced from the first end surface and adjacent a sensor cavity in which the sensor is positioned, a connection mechanism connecting the lower and upper plug (Continued)

portions, and a capillary filled with isolation fluid and extending from the first end surface through the lower and upper plug portions to the second end surface thereby coupling the pressure through the isolation diaphragm and the capillary to the sensor cavity and the sensor. The upper plug portion is formed from a first material and the lower plug portion is formed from a second material having higher corrosion resistance than the first material.

15 Claims, 2 Drawing Sheets

(51) Int. Cl.
  *G01L 7/08* (2006.01)
  *G01L 19/00* (2006.01)
(52) U.S. Cl.
  CPC ........ *G01L 19/003* (2013.01); *G01L 19/0046* (2013.01); *Y10T 29/49815* (2015.01)
(58) Field of Classification Search
  USPC .................................. 73/706, 714, 716, 724
  See application file for complete search history.

(56) References Cited

U.S. PATENT DOCUMENTS

| | | | | |
|---|---|---|---|---|
| 4,852,466 A * | 8/1989 | Freeman | ................. | G01L 7/082 73/715 |
| 4,970,898 A * | 11/1990 | Walish | ................. | G01L 19/0038 73/706 |
| 5,000,047 A * | 3/1991 | Kato | ................. | G01L 19/003 338/4 |
| 5,022,270 A * | 6/1991 | Rud, Jr. | ................. | G01F 1/383 361/283.3 |
| 5,184,514 A | 2/1993 | Cucci et al. | | |
| 5,212,989 A * | 5/1993 | Kodama | ................. | G01L 19/0038 338/4 |
| 5,396,802 A * | 3/1995 | Moss | ................. | G01B 7/14 336/30 |
| 5,524,492 A * | 6/1996 | Frick | ................. | G01L 19/0645 73/706 |
| 5,637,802 A * | 6/1997 | Frick | ................. | G01L 9/0075 361/283.4 |
| 5,665,899 A * | 9/1997 | Willcox | ................. | G01L 27/007 73/1.63 |
| 5,668,322 A * | 9/1997 | Broden | ................. | G01L 19/0015 137/798 |
| 5,670,722 A * | 9/1997 | Moser | ................. | G01L 19/0084 73/718 |
| 5,680,109 A * | 10/1997 | Lowe | ................. | G01L 27/007 137/557 |
| 5,709,337 A * | 1/1998 | Moser | ................. | G01L 19/0084 228/124.6 |
| 5,731,522 A * | 3/1998 | Sittler | ................. | G01L 19/0046 73/706 |
| 6,050,145 A * | 4/2000 | Olson | ................. | G01L 19/0084 73/706 |
| 6,079,276 A * | 6/2000 | Frick | ................. | G01L 9/0075 361/283.4 |
| 6,082,199 A * | 7/2000 | Frick | ................. | G01L 9/0075 29/839 |
| 6,089,097 A * | 7/2000 | Frick | ................. | G01L 9/0075 361/283.4 |
| 6,120,033 A | 9/2000 | Filippi et al. | | |
| 6,151,557 A * | 11/2000 | Broden | ................. | G01F 1/50 702/47 |
| 6,253,624 B1 * | 7/2001 | Broden | ................. | G01F 1/50 73/861.44 |
| 6,425,290 B2 * | 7/2002 | Willcox | ................. | G01L 9/0007 73/715 |
| 6,457,367 B1 * | 10/2002 | Behm | ................. | G01D 1/00 73/753 |
| 6,473,711 B1 * | 10/2002 | Sittler | ................. | G01L 15/00 137/597 |
| 6,480,131 B1 * | 11/2002 | Roper | ................. | G05B 19/0423 341/118 |
| 6,484,585 B1 * | 11/2002 | Sittler | ................. | G01L 9/0075 73/718 |
| 6,505,516 B1 * | 1/2003 | Frick | ................. | G01L 19/0092 73/718 |
| 6,508,129 B1 * | 1/2003 | Sittler | ................. | G01L 9/0075 73/715 |
| 6,516,671 B2 * | 2/2003 | Romo | ................. | G01L 9/0075 73/718 |
| 6,520,020 B1 * | 2/2003 | Lutz | ................. | G01L 9/0075 73/706 |
| 6,561,038 B2 * | 5/2003 | Gravel | ................. | G01L 9/0075 73/706 |
| 6,568,274 B1 * | 5/2003 | Lucas | ................. | G01L 19/04 73/718 |
| 6,662,662 B1 * | 12/2003 | Nord | ................. | G01L 19/0618 73/715 |
| 6,843,139 B2 * | 1/2005 | Schumacher | ........... | G01F 1/363 73/861.52 |
| 6,848,316 B2 * | 2/2005 | Sittler | ................. | G01L 19/147 73/706 |
| 6,848,318 B2 | 2/2005 | Gerst et al. | | |
| 6,871,546 B2 | 3/2005 | Scheurich et al. | | |
| 6,901,803 B2 * | 6/2005 | Fandrey | ............. | G01L 19/0007 73/706 |
| 6,938,490 B2 * | 9/2005 | Wagner | ................. | G01L 9/0042 73/708 |
| 6,966,229 B2 * | 11/2005 | Seeberg | ................. | G01L 9/0027 73/754 |
| 7,213,463 B2 | 5/2007 | Otsuka | | |
| 7,290,452 B2 * | 11/2007 | Hedtke | ................. | F16J 3/02 277/317 |
| 7,454,975 B2 | 11/2008 | Louwagie et al. | | |
| 7,458,275 B2 * | 12/2008 | Kleven | ................. | G01L 19/003 73/745 |
| 7,624,642 B2 | 12/2009 | Romo | | |
| 7,866,214 B2 * | 1/2011 | Banholzer | ........... | G01L 19/0092 73/714 |
| 7,962,294 B2 * | 6/2011 | Dozoretz | ................. | G01L 13/00 702/45 |
| 8,122,771 B2 * | 2/2012 | Seeberg | ............. | G01L 19/0092 73/756 |
| 8,371,175 B2 | 2/2013 | Romo | | |
| 8,479,582 B2 | 7/2013 | Volonterio et al. | | |
| 8,984,948 B2 * | 3/2015 | Becher | ................. | F15B 3/00 73/714 |
| 9,459,170 B2 * | 10/2016 | Haywood | ............. | G01L 9/0041 |
| 2002/0023499 A1 * | 2/2002 | Boehler | ................. | G01L 9/0075 73/715 |
| 2002/0100333 A1 * | 8/2002 | Gravel | ................. | G01L 9/0075 73/756 |
| 2003/0177837 A1 * | 9/2003 | Broden | ................. | G01L 19/0046 73/716 |
| 2005/0193825 A1 * | 9/2005 | Otsuka | ................. | G01L 19/0672 73/715 |
| 2005/0248434 A1 * | 11/2005 | Kurtz | ................. | B23K 15/0053 338/42 |
| 2006/0162458 A1 * | 7/2006 | Broden | ................. | G01L 13/025 73/708 |
| 2006/0236775 A1 * | 10/2006 | Mei | ................. | G01L 9/0072 73/724 |
| 2008/0006094 A1 * | 1/2008 | Schulte | ................. | G01F 1/34 73/736 |
| 2008/0053242 A1 * | 3/2008 | Schumacher | ........... | G01F 1/363 73/861.42 |
| 2008/0245158 A1 * | 10/2008 | Hedtke | ................. | G01L 19/0007 73/861.63 |
| 2009/0000393 A1 * | 1/2009 | Nyfors | ................. | G01F 1/363 73/861.19 |
| 2009/0165424 A1 * | 7/2009 | Lutz | ................. | G01L 13/025 53/289 |
| 2010/0198547 A1 * | 8/2010 | Mulligan | ............ | E21B 41/0007 702/100 |

(56) References Cited

U.S. PATENT DOCUMENTS

| | | | | |
|---|---|---|---|---|
| 2010/0281994 | A1* | 11/2010 | Brown | G01L 19/0645 73/729.1 |
| 2012/0006119 | A1* | 1/2012 | Broden | G01F 1/383 73/716 |
| 2012/0079884 | A1* | 4/2012 | Broden | G01L 13/026 73/717 |
| 2012/0125112 | A1 | 5/2012 | Volonterio et al. | |
| 2013/0074604 | A1* | 3/2013 | Hedtke | G01L 19/0061 73/753 |
| 2013/0160560 | A1* | 6/2013 | Strei | G01L 9/0042 73/706 |
| 2013/0167961 | A1* | 7/2013 | Becher | F15B 3/00 138/30 |
| 2013/0233058 | A1* | 9/2013 | Breen | G01F 1/44 73/49.8 |
| 2014/0083171 | A1* | 3/2014 | Strei | G01L 19/06 73/49.8 |
| 2014/0213103 | A1* | 7/2014 | Ohmeyer | G01D 11/24 439/571 |
| 2014/0298914 | A1* | 10/2014 | Vagle | G01L 19/00 73/716 |
| 2015/0000417 | A1* | 1/2015 | Hedtke | G01L 9/0042 73/724 |

FOREIGN PATENT DOCUMENTS

| | | |
|---|---|---|
| DE | 10 2007 010 589 | 9/2008 |
| JP | 58-11823 | 1/1983 |
| JP | 11-504710 | 4/1999 |
| JP | 2002-340717 | 11/2002 |
| JP | 2005-207875 | 8/2005 |
| JP | 2013-506741 | 2/2013 |
| WO | 96/05493 A1 | 2/1996 |
| WO | WO 96/34264 | 10/1996 |
| WO | WO 02/066948 | 8/2002 |
| WO | WO 2011/041491 | 4/2011 |

OTHER PUBLICATIONS

International Search Report and Written Opinion for PCT Application No. PCT/CN2013/079695, dated Apr. 30, 2014, 11 pages.
Blueprint, DP Level Final Assembly Weld Specification from Rosemount Inc. dated Nov. 8, 2011, 9 pages.
Communication from EP Application No. 13889377.1, dated Feb. 26, 2016.
Office Action from Chinese Patent Application No. CN 201380000803.0, dated Nov. 17, 2015.
Office Action from Chinese Patent Application No. 201380000803.0, dated May 10, 2016.
Office Action from Japanese Patent Application No. 2016/526394, dated Mar. 22, 2017.
Supplementary European Search Report from European Patent Application No. 138893771, dated Mar. 9, 2017.
"Druckmessgerate SITRANS P. Messumformer fur Relativ-, Absolut- und Diferenzduck, Durchfluss und Fullstand", 70 pages, Dec. 31, 2009.

* cited by examiner

PRESSURE TRANSMITTER HAVING AN ISOLATION ASSEMBLY WITH A TWO-PIECE ISOLATOR PLUG

CROSS-REFERENCE TO RELATED APPLICATION

This Application is a Section 371 National Stage Application of International Application No. PCT/CN2013/079695, filed Jul. 19, 2013, not yet published, the contents of which are hereby incorporated by reference in their entirety.

BACKGROUND OF THE INVENTION

The present invention relates to industrial process pressure transmitters. More particularly, the present invention relates to isolator plugs of isolator mounting assemblies for supporting a pressure sensor and for isolating the pressure sensor and an interior cavity of the transmitter from a process line fluid to be measured.

Industrial process control systems are used to monitor and control industrial processes which produce or transfer liquids or the like. In such systems, it is typically important to measure "process variables" such as temperatures, pressures, flow rates, and others. Process control transmitters are used to measure such process variables and transmit information related to the measured process variable back to a central location such as a central control room.

One type of process variable transmitter is a pressure transmitter which measures pressures, or pressure differences between two pressures, of process fluids and provides an output related to the pressures or pressure differences. In the case of differential pressures, the pressure difference may, in turn, represent a flow rate, a level of process fluid in a vessel, or other process variable. The transmitter is configured to transmit information related to the pressures or differential pressures back to the central control room. The transmission is typically sent over a two wire process control loop; however, other communication techniques may be used, including wireless techniques.

To measure such pressures, the pressures must be coupled to the process variable transmitter through some type of process coupling. For example, the process fluid can comprise a component used in an industrial process such as natural gas, oil, etc. In industrial process pressure transmitters, isolator mounting assemblies used to isolate a pressure sensor from the fluid to be measured in a process line are known. Typically, the isolator mounting assembly mounts at the base of a transmitter housing in a hole that opens to an interior cavity of the transmitter. An isolation plug of the isolator mounting assembly provides a capillary tube to transfer the process pressures to the pressure sensor, while the interior cavity protects known circuitry that connects to the pressure sensor in order to obtain a signal proportional to the pressure in the process line. Since some process fluids are highly corrosive, some process transmitters are required to use isolation plugs made from materials which are known to be resistant to corrosion or damage from these corrosive process fluids. Such corrosion resistant materials, such as Alloy C-276, add significantly to the material cost of the process transmitter.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A pressure transmitter connectable to a process line provides an output responsive to a pressure in the process line. The transmitter includes a housing having a base with a process end coupled to an interior cavity formed in the housing, a sensor for sensing the pressure and an isolating assembly mounted at the process end of the housing and isolating fluid in the process line from the interior cavity. The isolating assembly includes an isolation diaphragm configured to be fluidically coupled to the process pressure in the process line, and an isolator plug positioned in the process of the housing adapter. The isolator plug having a lower plug portion providing a first end surface adjacent the isolation diaphragm, an upper plug portion providing a second end surface distally spaced from the first end surface and adjacent a sensor cavity in which the sensor is positioned, a connection mechanism connecting the lower and upper plug portions, and a capillary filled with isolation fluid and extending from the first end surface through the lower and upper plug portions to the second end surface thereby coupling the pressure through the isolation diaphragm and the capillary to the sensor cavity and the sensor. The upper plug portion is formed from a first material and the lower plug portion is formed from a second material having higher corrosion resistance than the first material.

In exemplary embodiments, the pressure transmitter is connectable to the process line using the isolation assembly, and once coupled the pressure transmitter provides an output responsive to the pressure in the process line.

In some embodiments, the lower plug portion of the isolator plug has surfaces wetted by a process fluid from the process line when the pressure transmitter is connected to the process line, and the upper plug portion does not have surfaces wetted by the process fluid when the pressure transmitter is connected to the process line. With the process wetted surfaces, the lower plug portion of the isolator plug is formed from a more corrosive resistant material than is the upper plug portion. This allows the material cost of the isolator plug and of the transmitter to be reduced, while maintaining corrosion resistance to corrosive process environments. In some exemplary embodiments, the first material of which the upper plug portion is formed can comprise 316L stainless steel. Also, in some embodiments, the second material of which the lower plug portion is formed comprises Alloy C-276. Other materials can also be used for either of the upper and lower portions of the isolator plug.

DETAILED DESCRIPTION

The present disclosure provides an isolation assembly for a pressure sensor in a pressure transmitter which isolates one or more pressure sensors of the transmitter from corrosive process fluids, while allowing the material costs associated with manufacturing the transmitter to be reduced.

Figure 1:
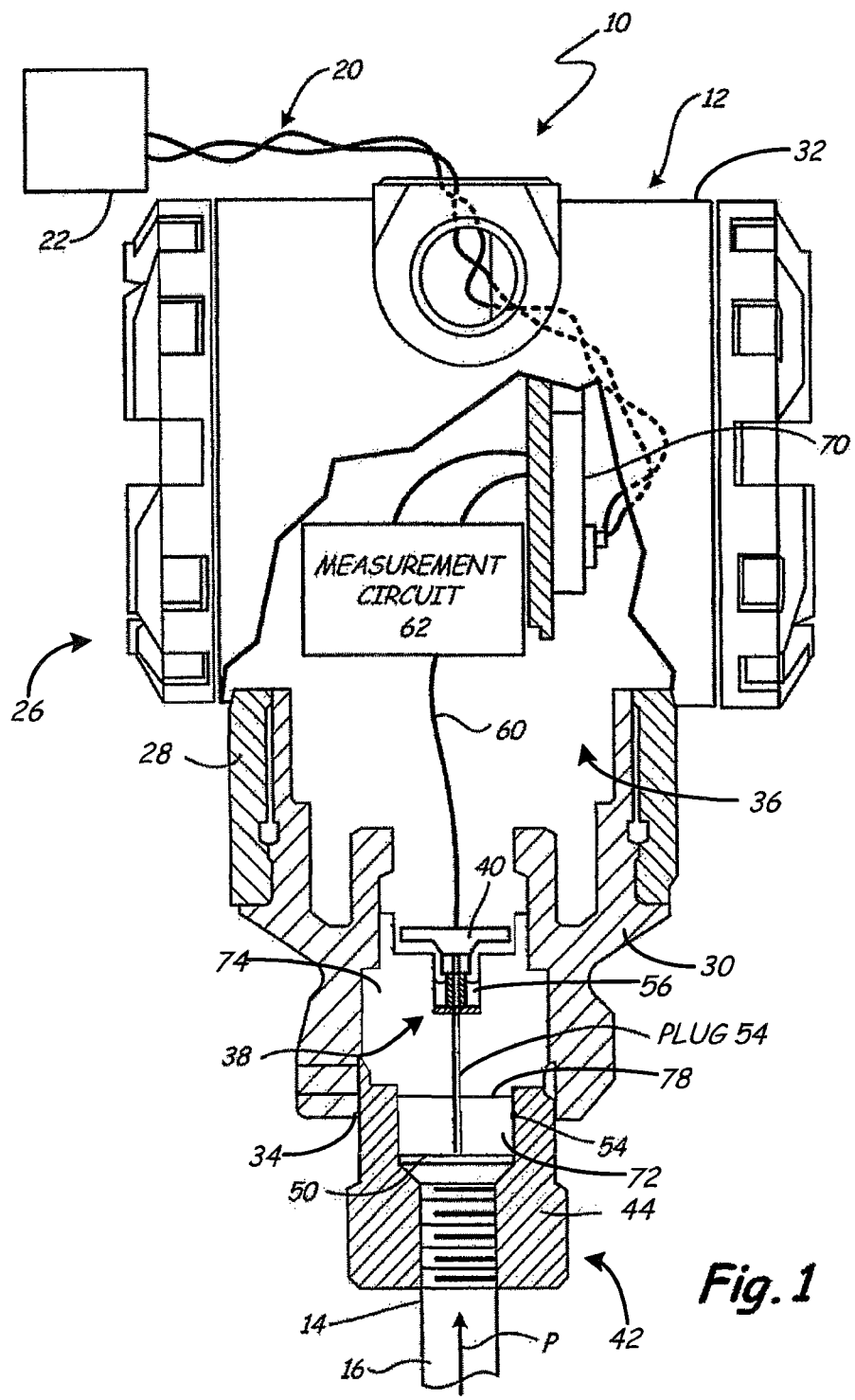
FIG. 1 is a partial cutaway view of a pressure transmitter in a process control or monitoring system having an isolation plug in accordance with a first example embodiment.

FIG. 1 is a diagram showing a process control or measurement system 10 which includes a pressure transmitter 12 coupled to process piping 14 which carries a process fluid 16. (Transmitter 12 is a measurement component of system 10.) The process fluid 16 applies a pressure P to the pressure transmitter 12. Pressure transmitter 12 provides an output, for example on a two-wire process control loop 20 to a remote location such as a control room 22. The process control loop 20 can operate in accordance with any appropriate protocol. In one configuration, process control loop 20 comprises a two-wire process control loop in which an analog current level is used to represent a "process variable" related to the process pressure P. In another example implementation, the process control loop 20 carries a digital value which is related to the process pressure P. Examples of such protocols include the HARTO or Foundation FieldBus communication protocol. Another example process control loop comprises a wireless communication link. In such a configuration, element 20 represents a wireless communication link between transmitter 12 and process control room 22.

The components of transmitter 12 are described in greater detail with reference to one example embodiment having an improved process coupling or isolator mounting assembly 42. Transmitter 12 includes a body or housing 26 having a base 28, a housing adapter 30 joined to the base 28 by a threaded or other connection, and an enlarged body 32. In other embodiments, adapter 30 and base 28 can be integrally formed instead of connected components. Adapter 30 and/or base 28 can also be formed in different shapes and sizes to accept different sized and shaped connectors 44 and isolation plugs 54. The housing adapter 30 includes a hole 34 that receives the isolator mounting assembly 42 of exemplary disclosed embodiments. Without the isolator mounting assembly 42 and other components of the transmitter 12 described below, the hole 34 opens into an interior cavity 36 formed in the enlarged body 32.

The isolator mounting assembly 42 includes a connector 44, an isolator diaphragm 50, and an isolator plug 54. Isolator mounting assembly 42 isolates process fluid 16 from entering the interior cavity 36. Transmitter 12 includes a pressure sensor (pressure sensor die) 40 which can operate in accordance with any appropriate technique. Example techniques include micro machine configurations, for example, which have an element with an electrical property which changes in response to applied pressure. Disclosed embodiments are not limited to use with any particular type of pressure sensor, and other known pressure sensors types, fluidically coupled to the isolator diaphragm 50, can be used with disclosed embodiments. For example, capacitive-based and optically-based pressure sensors can be used. Isolator mounting assembly 42 couples housing 26 of transmitter 12 to process piping 14. This allows the process pressure P to be applied to isolation diaphragm 50. The pressure P causes a deflection in the diaphragm 50 which is transmitted through a capillary tube 52 and a sensor cavity 56, both of which contain an isolation fluid, to the pressure sensor 40. The capillary tube 52 extends through isolator plug 54 which also supports a sensor mount 38 configured to mount pressure sensor 40. Pressure sensor 40 provides an electrical output 60 to measurement circuitry 62. Measurement circuitry 62 connects to a terminal block 70 which couples to the process control loop or wireless communication link 20. In one example configuration, process control loop 20 is also used to provide power to circuitry, such as measurement circuitry 62, of transmitter 12.

As discussed above, in some industrial process applications, isolator plug 54 must be made of corrosion resistant materials, such as Alloy C-276, for use with highly corrosive process fluids. These corrosion resistant materials are typically costly as compared to other materials available for use in manufacturing transmitter 12. For example, in the case of Alloy C-276, due to its higher nickel content, the raw material cost of Alloy C-276 is about seven times higher than 316L stainless steel. Isolator plug 54 provides the opportunity for lower material costs by utilizing a two-piece capsule design in which the process fluid wetted surfaces of the plug are made of a corrosion resistant material, for example Alloy C-276, while non-wetted surfaces are made from other materials such as 316L stainless steel. In FIG. 1, lower isolation plug 72 provides the process fluid wetted surfaces and is therefore made from the corrosion resistant material, while upper isolation plug 74 is made from other material which is preferably a lower cost material. The upper and lower isolator plugs are joined together using a deep penetration laser weld 78 or by other connection mechanisms.

Figure 2:
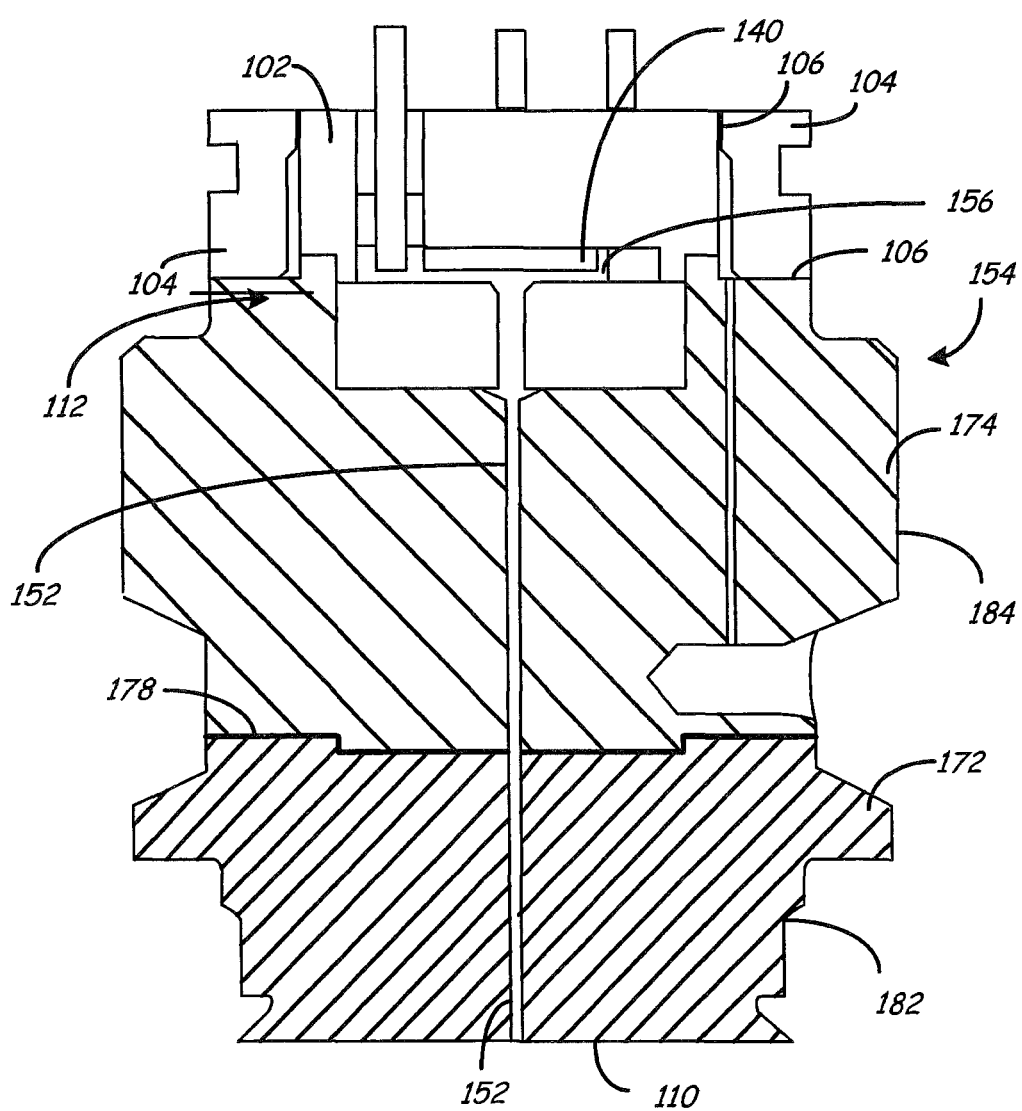
FIG. 2 is an enlarged cross sectional view of another embodiment of an isolation plug similar to the isolation plug of the pressure transmitter of FIG. 1.

Referring now to FIG. 2, shown is a second embodiment of an isolator plug 154 in accordance with exemplary embodiments. Like plug 54, plug 154 is separated into lower and upper plug portions 172 and 174. A capillary 152 filled or fillable with isolation fluid extends from a lower end 110 of lower isolation plug 172, which is configured to be positioned adjacent an isolation diaphragm, toward an upper end 112 of upper isolation plug 174. Capillary 152 therefore extends through both lower and upper isolation plugs 172 and 174 and fluidly connects to sensor cavity 156 to couple the process pressure to a pressure sensor 140. Once again, the upper and lower isolator plugs are joined together using a connection mechanism 178 such as a deep penetration laser weld 178. Also shown in the embodiment of FIG. 2 are a header 102 and a weld ring 104. Mixed metal welds 106 connect header 102 to weld ring 104, and one or both of weld header 102 and weld ring 104 to upper isolation plug 174.

Again, by splitting the isolator plug assembly 154 into two pieces, the use of the high-cost materials can be minimized or greatly reduced. The lower isolation plug 172 providing surfaces 182 which are potentially exposed to and wetted by process fluids is constructed or formed from more corrosion resistant material such as Alloy C276. The upper isolation plug 174, with surfaces 184 that do not contact the process fluid or medium, is made from a lower cost and likely less corrosion resistant material such as 316L stainless steel. Alloys other than Alloy C276 and 316 stainless steel can also be used. By carefully selecting the design dimensions of each of the lower and upper isolation plugs, stress forces on the weld joint or connection 178 can be minimized. At the same time, any necessary increases in required oil or isolation fluid volume as compared to previous one-piece isolation plug designs can also be minimized.

Although the present invention has been described with reference to preferred embodiments, workers skilled in the art will recognize that changes may be made in form and detail without departing from the spirit and scope of the invention. The hole in the adapter is positioned at a process end of the adapter. The housing and housing adapter are one example of a housing assembly. However, any number of components can be used for the housing assembly.

What is claimed is:

1. A pressure transmitter connectable to a process line and providing an output responsive to a pressure in the process line, the transmitter comprising:

a housing including a housing adapter having a sensor cavity formed in the housing, the housing adapter providing an opening to the sensor cavity;

a sensor in the sensor cavity for sensing the pressure;

an isolating assembly mounted at a process end of the housing adapter and isolating fluid in the process line from the sensory cavity, the isolator assembly mounted in the opening of the housing adapter, the isolating assembly comprising:

an isolation diaphragm configured to be fluidically coupled to the process pressure in the process line;

an isolator plug positioned in the housing adapter, the isolator plug having a lower plug portion providing a first end surface adjacent the isolation diaphragm, an upper plug portion aligned with and abutting the lower plug portion and providing a second end surface distally spaced from the first end surface and adjacent a sensor cavity in which the sensor is positioned, a connection mechanism connecting the lower and upper plug portions, and a capillary filled with isolation fluid and extending from the first end surface through the lower and upper plug portions to the second end surface thereby coupling the pressure through the isolation diaphragm and the capillary to the sensor cavity and the sensor, wherein the upper plug portion is formed from a first material and the lower plug portion is formed from a second material having higher corrosion resistance than the first material, wherein the capillary extends through the lower isolation plug portion and the upper isolation plug portion;

a sensor mount, carried by the upper plug portion and located at least partially in a bore extending inwardly from the second end surface, which mounts the sensor in the sensor cavity, wherein the capillary extends through the lower plug portion, the upper plug portion, which fluidically couples to the sensor through the sensor mount; and a connector configured to mount the isolator plug in the housing adapter and couple to process piping.

2. The pressure transmitter of claim 1, wherein the lower plug portion of the isolator plug has surfaces wetted by a process fluid from the process line when the pressure transmitter is connected to the process line, and wherein the upper plug portion does not have surfaces wetted by the process fluid when the pressure transmitter is connected to the process line.

3. The pressure transmitter of claim 2, wherein the connection mechanism connecting the lower and upper plug portions is a weld connection.

4. The pressure transmitter of claim 2, wherein the isolating assembly further comprises a connector which connects to the process line and fluidically couples the isolation diaphragm to the process pressure.

5. The pressure transmitter of claim 2, wherein the housing includes a housing adapter forming the base of housing and connected to an upper portion of the housing.

6. The pressure transmitter of claim 5, wherein the housing adapter and the base are integrally formed.

7. The pressure transmitter of claim 1, and further comprising:

measurement circuitry positioned in the housing and electrically coupled to an electrical output of the sensor; and a termination block electrically coupled to the measurement circuitry and configured to be coupled to a control room through a communication link.

8. The pressure transmitter of claim 7, wherein the communication link comprises a process control loop.

9. The pressure transmitter of claim 8, wherein the communication link is a wireless communication link.

10. The pressure transmitter of claim 1, wherein the first material of which the upper plug portion is formed comprises 316L stainless steel, and wherein the second material of which the lower plug portion is formed comprises Alloy C-276.

11. An isolation assembly for use with a pressure transmitter to couple a pressure sensor to a process pressure in a process line, the isolation assembly comprising:

an isolation diaphragm configured to be fluidically coupled to the process pressure in the process line;

a connector configured to connect to the process line and to fluidically couple the isolation diaphragm to the process pressure;

a housing adapter coupled to the connector;

a housing coupled to the housing adapter having a sensor cavity formed therein which contains the pressure sensor, the housing adapter providing an opening to the sensor cavity;

an isolator plug in the opening of the housing adapter configured to be positioned at a process end of the housing assembly of the pressure transmitter, the isolator plug having a lower plug portion providing a first end surface adjacent the isolation diaphragm, an upper plug portion providing a second end surface distally spaced from the first end surface and configured to be positioned adjacent the sensor cavity in the housing assembly in which the pressure sensor is positioned, the isolator plug further having a connection mechanism connecting the lower and upper plug portions, and a capillary filled with isolation fluid and extending from the first end surface through the lower and upper plug portions to the second end surface to thereby couple the process pressure to the pressure sensor of the transmitter, wherein the upper plug portion is formed from a first material and the lower plug portion is formed from a second material having higher corrosion resistance than the first material;

a sensor mount, carried by the upper plug portion and located at least partially in a bore extending inwardly from the second end surface, which mounts the sensor in the sensor cavity, wherein the capillary extends through the lower plug portion, the upper plug portion, which fluidically couples to the sensor through the sensor mount; and a connector configured to mount the isolator plug in the housing adapter and couple to process piping.

12. The isolation assembly of claim 11, wherein the lower plug portion of the isolator plug has surfaces wetted by a process fluid from the process line when the isolation assembly is used with the pressure transmitter and is connected to the process line, and wherein the upper plug portion does not have surfaces wetted by the process fluid when the isolation assembly is used with the pressure transmitter is connected to the process line.

13. The isolation assembly of claim 11, wherein the connection mechanism connecting the lower and upper plug portions is a weld connection.

14. The isolation assembly of claim 13, wherein the weld connection is a deep penetration laser weld.

15. The isolation assembly of claim 11, and further comprising the pressure transmitter.

* * * * *

UNITED STATES PATENT AND TRADEMARK OFFICE
CERTIFICATE OF CORRECTION

PATENT NO.         : 9,689,769 B2
APPLICATION NO.    : 14/007219
DATED              : June 27, 2017
INVENTOR(S)        : Christopher Lee Eriksen and Lihong Xu It is certified that error appears in the above-identified patent and that said Letters Patent is hereby corrected as shown below:

Page 3; Column 2, Line 8:
In the references please amend "WO 2011041491" so that the nine is an eight.

In Claim 11:
Please add the word "to" after the word "adjacent" in line thirty-one of column six.

Signed and Sealed this
Seventh Day of May, 2019

Andrei Iancu
*Director of the United States Patent and Trademark Office*